Aug. 14, 1956     F. C. ARMISTEAD ET AL     2,759,107

SCINTILLOMETER

Filed June 20, 1952

INVENTORS
FONTAINE C. ARMISTEAD
THERESA M. McKEE
BY
*J. H. Grahame*
ATTORNEY

United States Patent Office 2,759,107
Patented Aug. 14, 1956

2,759,107
SCINTILLOMETER

Fontaine C. Armistead, Marblehead, Mass., and Theresa M. McKee, New York, N. Y., assignors to Texaco Development Corporation, New York, N. Y., a corporation of Delaware Application June 20, 1952, Serial No. 294,556

5 Claims. (Cl. 250—71)

This invention relates to the detection and measurement of radiation such as ultraviolet rays, beta rays, alpha particles, neutrons, and the like, and more particularly to a luminophor element for such purposes.

The invention broadly contemplates the detection and measurement of radiation with detecting means comprising a gaseous or vaporous type of luminophor.

Certain substances such as crystalline anthracene and sodium iodide, and liquids such as p-terphenyl dissolved in xylene, have been found to possess the property of converting the energy of alpha, beta, and gamma radiation into light energy in the visible and near ultraviolet range of the spectrum. Such substances are called luminophors, and their utilization in the detection of such radiation has been practiced to some extent. In the simpler arrangements, the luminophor is subjected to primary radiation, and the resulting luminescent radiation originating in the luminophor is detected in an electron multiplier of the phototube type and subsequently measured by suitable apparatus. Heretofore, such luminophors have been employed in the solid or liquid form.

Solid and liquid luminophors may react with only a portion of lightly ionizing particles which impinge upon them. Nevertheless, the fluorescent efficiency of solid or liquid luminophors for detecting lightly ionizing radiation, such as gama rays, is relatively high since a large amount of the energy of those particles which do react with the luminophor is converted into fluorescent light resulting in large pulse size. On the other hand, although a solid or liquid luminophor may react with each heavily ionizing particle, such as alpha particles or protons, which it receives, the percentage of the energy of the particle which is converted into fluorescent light is much lower than that resulting from the interaction with radiation such as gamma radiation. Thus, solid and liquid luminophors have a lower fluorescent efficiency for heavily ionizing radiation than for lightly ionizing radiation. This lowered fluorescent efficiency is also evident in a common method of thermal neutron detection whereby neutrons are caused to react with a substance which will subsequently emit alpha particles; the alpha particles then react with a luminophor resulting in the emission of fluorescent light. It is this latter reaction which is subject to the limitations described above.

The present invention, in overcoming the aforesaid disadvantages and in providing an improved luminophor element for use in detecting and measuring radiation comprises the use of a gaseous or vaporous luminophor in combination with means for detecting and measuring the fluorescent light emitted by the luminophor. Such a means is, for example, a photoelectric device such as a photomultiplier tube in combination with a suitable pulse registering device.

It is known that heavily ionizing particles such as protons and alpha particles are less efficient in converting their kinetic energy into secondary radiation, that is, into fluorescent light, in solid and liquid luminophors than are lightly ionizing radiations. The smaller the region in which ionization and excitation of the luminophors are produced, that is, the greater the ionization and excitation density, the smaller is the efficiency of converting this energy into fluorescent light. Thus, since a luminophor has less concentrated ionization and excitation in the vapor than in the solid or liquid state, a heavily ionizing particle causes the release of more light in a vapor than in a solid or liquid. The resulting large pulse size is advantageous in a radiation detector employing a luminophor since a high discriminator level may be used in an electronic circuit wherein the secondary radiation emitted by the luminophor is detected and measured. This advantage is especially useful if a photo-multiplier tube is used in this circuit since a higher discriminator level results in lowered photomultiplier tube "noise" counts.

On the other hand, a gas or vapor presents very little material with which a lightly ionizing radiation, such as gamma rays, can react. Thus, the efficiency obtained for the detection of gamma rays by a gaseous or vaporous luminophor will be low. As will be explained more fully in the following, this low efficiency for gamma rays which is shown by a luminophor employed in the gaseous or vaporous state has a particular advantage over solid or liquid luminophors in the detection of neutrons which are present in admixture with gamma rays.

Another advantage of the invention is the provision of a luminophor element for use in the detection of radiation, having a high fluorescence efficiency for heavily ionizing radiation, such as alpha particles, and protons, and also for fast and thermal neutrons which are detected by means of the heavily ionizing radiation which they release from the walls of the vessel containing the gaseous or vaporous luminophor or from the luminophor itself.

Since the gaseous or vaporous luminophor of the invention may be contained in an envelope which is transparent to the radiation being detected and measured, an advantage of the invention resides in the fact that the shape of the luminophor is limited only by the containing envelope and thus the luminophor can be used in almost any desired form.

Another advantage of the invention is the provision of an improved luminophor element for use in the detection and measurement of radiation wherein the dimension as respects the self-absorption thereof for the radiation generated therein is not a limiting factor.

A further advantage of the invention, arising from the employment of a gas or vapor as a luminophor, is the provision of an improved scintillation detector for the measurement of radiation wherein loss by reflection and scattering of radiation generated within the luminophor is greatly minimized.

These and other advantages of the invention will be explained in the following description and claims taken in conjunction with the attached drawings wherein:

Among the gases or vapors which may be used as gasiform luminophors for the detection of radiation such as neutrons, protons, alpha, beta, and gamma rays, and ultraviolet radiation are the following: Aromatic hydrocarbons, especially of the condensed ring type, for example, anthracene, benzopyrene, phenanthrene, and naphthalene; mixtures of aromatic hydrocarbons and aromatic amines, for example, benzene and aniline; non-aromatic organic compounds such as acetone, acetaldehyde, diacetyl, diethyl ketone, and propionaldehyde; halogen vapors and mixtures thereof with inert gases, especially the mixture of iodine vapor with nitrogen; metal halides, and diatomic vapors of metal halides, in particular lithium iodide and lithium bromide; and, used singly or in combination, the rare gases, including helium and argon, and also hydrogen, nitrogen, oxygen, and carbon dioxide.

Figure 1:
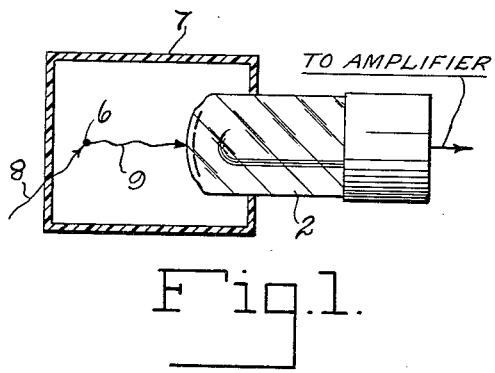
Figure 1 illustrates the improved luminophor element used in conjunction with a photomultiplier tube for the detection of radiation such as ultraviolet radiation.

A form of the invention is illustrated by Figure 1. The numeral 8 indicates radiation such as ultraviolet radiation passing through an envelope 7 which is composed of a material transparent to the radiation 8. For example, in the detection of ultraviolet radiation, an ultraviolet-transmitting glass, such as quartz or one of the Corex glasses manufactured by Corning, may be used as the envelope. The envelope 7 contains a gaseous or vaporous luminophor, a molecule of which is represented by a dot 6. If the radiation to be detected is ultraviolet radiation, a vapor such as acetone, acetaldehyde, or an aromatic hydrocarbon, may be employed as the luminophor. The radiation 8 strikes a luminophor molecule causing it to release secondary radiation 9 which passes to a photomultiplier tube 2. In the photomultiplier tube the secondary radiation causes the emission of photoelectrons which are multiplied and passed to amplifying and recording means. The amplifying and recording means are conventional and are not illustrated.

Figure 2:
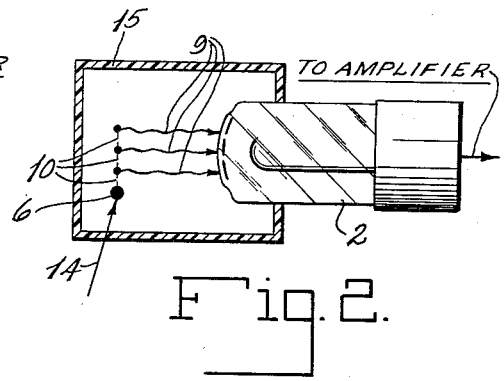
Figure 2 illustrates the improved luminophor element for use in the detection of fast or thermal neutrons.

Figure 2 illustrates a form of the invention by means of which fast or thermal neutrons may be detected. The numeral 14 designates a fast or thermal neutron passing through an envelope 15. In the detection of fast or thermal neutrons the envelope may be composed of almost any material such as glass, aluminum or steel. Note, however, that for thermal neutrons the high capture elements, such as lithium, boron, cobalt, silver, cadmium, gold and mercury should be present to a small extent if at all. The envelope 15 contains the gaseous or vaporous luminophor, a molecule of which is represented by a dot 6. In the detection of fast neutrons, the gas or vapor employed as the luminophor is one which contains a large proportion of a light element such as hydrogen, helium, lithium, or beryllium. Examples of such gases or vapors are helium and hydrogen gases, and hydrocarbon vapors such as those of anthracene or naphthalene. If the radiation to be detected is thermal neutrons, the vapor of a substance such as a compound of boron or lithium, which emit alpha particles upon interaction with thermal neutrons, is used alone, if it be one of the gasiform luminophors, or in admixture with one of the gasiform luminophors which luminesce when subjected to alpha particle irradiation. The radiation 14 strikes a luminophor molecule causing the release of secondary radiation 9 which passes to a photomultiplier tube 2. Note that the secondary radiation 9 comes from many molecules like 6 which lie in the path of the heavily ionizing radiation 10 that originates at molecule 6. In the photomultiplier tube the secondary radiation causes the emission of photoelectrons which are multiplied and amplified as described above.

Figure 3:
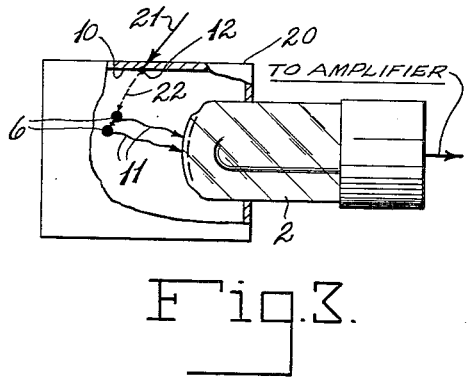
Figure 3 illustrates another form of the improved luminophor element for use in the detection of fast or thermal neutrons.

Figure 3 represents a form of the invention by means of which fast or thermal neutrons may be detected and measured. In the detection of thermal neutrons a neutron 21 strikes the envelope 20, formed of glass, aluminum, steel or other material which does not substantially hinder the passage of neutrons, enters an interior coating 10 of a substance, such as boron, lithium, or a compound thereof, an atom of which, designated by 12, reacts with the neutron to emit secondary radiation such as an alpha particle, whose path is indicated by the numeral 22. This thermal neutron-reactive coating 10 is preferably placed on the inner side of the envelope 20, although it is contemplated that it may be used as an exterior coating. An interior coating is especially preferred if the secondary radiation consists of alpha rays, since if the coating is placed on the exterior of the envelope, the envelope may hinder the passage of the alpha rays into the luminophor. If fast neutrons are to be detected, the numeral 10 represents an interior coating of a substance containing a large proportion of a low atomic weight constituent, for example, a hydrogenous substance such as a paraffin. A fast neutron strikes this coating 10 and causes a hydrogen atom 12 to recoil and lose its orbital electron. In this form the hydrogen atom is a proton, whose path is represented in the figure by the numeral 22. The heavily ionizing particles along path 22, whether they be alpha particles from thermal neutrons or protons from fast neutrons, react with the molecules of the gaseous luminophor, repersented by the numeral 6, causing them to emit secondary radiation 11. The radiation 11 passes to the photomultiplier tube, etc. as described in connection with Figure 1.

The forms of the invention as illustrated by Figures 1, 2, and 3 are especially useful in the detection of fast or thermal neutrons which are in admixture with gamma rays. Alpha particles produced by thermal neutrons in a solid or liquid luminophor containing added boron or lithium give poor pulses, not only because of the high ionization density effect, but also because the neutron-reactive additive usually quenches the luminescence to some extent, whereas the gasiform luminophor of the invention produces good pulses from alpha particles. On the other hand, since a gas has very low stopping power for gamma rays, the gasiform luminophor of the invention has low efficiency for detecting gamma rays, thus in a mixture of gamma rays and thermal neutrons, the luminophor element of the invention will detect the thermal neutrons but very few of the gamma rays. Similarly, the gaseous or vaporous luminophor may be used to detect alpha particles, protons, or other heavily ionizing particles when they are present with lightly ionizing particles such as gamma rays while having low efficiency for the detection of the lightly ionizing radiation.

Figure 4:
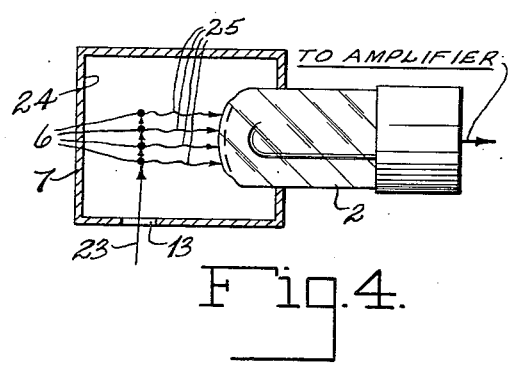
Figure 4 illustrates the improved luminophor element used in conjunction with a photomultiplier tube for the detection of protons or of beta or alpha radiation.

Beta rays may be detected and measured by means of a form of the invention illustrated by Figure 4. In the detection of beta rays it is advantageous to use a backscattering reflector for beta rays in conjunction with the luminophor. The reflector, indicated in the figure by the numeral 24, may be in the form of a coating or foil of, for example, lead, bismuth, or gold, and is provided with a window 13. The window is composed of a material, such as thin aluminum foil, transparent to beta rays. A beta ray 23 passes through the window 13 and strikes the gasiform luminophor molecules 6 causing them to emit secondary radiation 25. This secondary radiation 25 is recorded as described above. This form of the invention may also be used to detect alpha rays or protons if the window 13 is composed of a material transparent to this radiation; in this respect the window may be very thin glass.

In order to prevent loss of such emitted light by reflection and scattering through the walls of an envelope containing a gasiform luminophor of the invention, a light-reflector may be used in conjunction with the envelope. This reflector, which is not illustrated in the drawings, may be a thin coating of aluminum or of magnesium or titanium oxide surrounding the interior of the envelope or its exterior if the enevelope is transparent.

Figure 5:
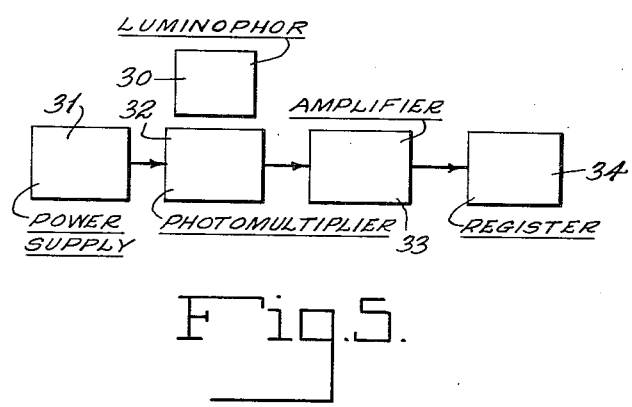
Figure 5 illustrates an arrangement of apparatus, including the novel luminophor element, useful for detecting radiation.

Referring to Figure 5, the numeral 30 designates a novel luminophor element of the invention, coupled in light-conductive relationship with a photoelectric device 32 capable of converting light variations into electric variations. A power supply 31 is provided for energizing the device 32. The output from the device 32 is fed into an amplifier 33, which in turn is connected to a suitable indicator or register 34.

In operation, the detecting portion of the device is placed adjacent a source of radiation which strikes the luminophor element 30. The interaction between the radiation and the gasiform luminophor in the element 30 results in the production of luminescent light rays which in turn strike the photoelectric device 32 and are thereby converted into electrical variations. For example, if the photoelectric device 32 comprises a photomultiplier tube, the light rays are converted into electrical pulses or signals which are passed to the amplifier 33, the resulting amplified signals being fed into the indicator or register 34 and are thus indicative of the intensity and of the energy of the radiation which is being investigated.

If desired to increase the total pressure of the gasiform luminophor, and thus the quanity of it present within an enclosed envelope, another gaseous or vaporous material may be combined therewith under pressure. For example, the total pressure of a gasiform luminophor whose active component is naphthalene may be increased by placing naphthalene in an enevelope with methane under pressure.

A particular advantageous application of the novel luminophor element of the invention lies in its employment as a proportional counter of fast neutrons. In a gas of vapor containing a large proportion of hydrogen, the faster the neutron, the faster is the maximum, and also the average, proton recoil which results, as explained hereinbefore, from the interaction of the neutron with the hydrogen atoms. For example, fast neutrons traversing a path of 16 cm. through a hydrogenous gas at atmospheric pressure will result in the scattering of about 10% of the neutrons with the attendant proton recoils. The protons will have energies from zero up to the energy of the original unscattered neutron (a 2.5 Mev. proton has a range of approximately 10 cm. in such a gas), and will give maximum, and average, fluorescent pulse size proportional to the maximum, and average, neutron energy. Thus by enclosing the gasiform luminophor in a container having an internal volume corresponding to the paths of neutrons of a certain maximum energy, it is possible to count proportionally neutrons of this and smaller energies. Higher gas pressures will correspondingly increase the percentage of neutrons scattered and reduce the range of the recoil protons. Higher pressures may be obtained as described in the foregoing paragraph, or may be obtained by heating the condensed material whence the gas or vapor is evolved in its envelope. If heat is employed to raise the pressure, it is advisable to separate the luminophor element from the phototube, which must be kept cool to keep down the background noise, and ultimately to avoid destroying the photocathode.

Although the use of a photoelectric device, such as a photomultiplier tube, with suitable amplifying and recording means, has been described for the detection and measurement of the secondary radiation emitted by the gasiform luminophor, it is to be understood that other detecting and recording means may be used. Thus, the gasiform luminophor may be used in, or in conjunction with a photosensitive Geiger-Mueller tube, whereby the secondary radiation emitted by the luminophor excites the photosensitive cathode of the Geiger-Mueller tube to emit photoelectrons.

In practice, the mission of visible or ultraviolet light as secondary radiation by a luminophor is usually a factor in considering its suitability as a detector of radiation. This factor is of importance since the most convenient means for measuring the secondary radiation emitted by a luminophor is a photoelectric device, such as a photomultiplier tube, which is sensitive to ultraviolet or visible light. In this respect, the use of gas or vapor, since it absorbs very little visible or ultraviolet light as compared with a solid or liquid, and has none of the optically scattering imperfections found in the solid state, has the outstanding advantage of substantially not hindering, by absorption or scattering, the photoelectric device from receiving the light emitted as secondary radiation. On the other hand, other forms of luminophors, do absorb and scatter a certain quantity of the light they emit, and thus prevent it from reaching the means provided for measuring the emitted light.

Obviously, many modifications and variations of the invention as hereinbefore set forth, may be made without departing from the spirit and scope thereof, and therefore, only such limitations should be imposed as are indicated in the appended claims.

I claim:

1. In a detector of radiation, the combination of a sealed container confining a gasiform luminophor comprising a noble gas capable of interacting with said radiation and emitting light, and means associated with said container for measuring said light.

2. In a detector of neutrons, the combination of a sealed container confining a gasiform substance which emits ionizing radiation upon interaction with said neutrons, said gasiform substance being in admixture with a gasiform luminophor capable of interacting with said ionizing radiation and emitting light, and means associated with said container for measuring said light.

3. In a detector of fast neutrons, the combination of a sealed container confining an admixture of a gasiform substance which emits ionizing radiation upon interaction with said fast neutrons and a gasiform luminophor capable of interacting with said ionizing radiation and emitting light having an intensity proportional to the energy of said ionizing radiation, and means associated with said container for measuring said light, whereby said fast neutrons are counted proportionally in said detector of radiation.

4. A detector according to claim 1, wherein argon is the luminophor.

5. A detector of penetrative radiation comprising a gasiform luminophor including a noble gas capable of converting individual units of mixed kinds of penetrative radiation, such as individual photons and quanta, into scintillations of different intensities for said different kinds with the most intense scintillations resulting from a different one of said kinds of radiation than would produce the most intense scintillations in predetermined solid and liquid luminophors; a photo-electric device to convert scintillations originating in said gasiform luminophor into electrical pulses having different amplitudes in accordance with different intensities thereof; and a utilization device for selectively responding to ones of said pulses in accordance with their amplitudes.

References Cited in the file of this patent

UNITED STATES PATENTS

| 2,508,772 | Pontecorvo | May 23, 1950 |
| 2,517,404 | Morton | Aug. 1, 1950 |
| 2,648,012 | Scherbatskoy | Aug. 4, 1953 |
| 2,659,011 | Youmans et al. | Nov. 10, 1953 |

OTHER REFERENCES

"Fluorescence and Phosphorescence," Pringsheim 1949, published by Interscience Publishers Inc., New York, N. Y.; pp. 258, 269–281.

Fluorescent Liquids for Scintillation Counters, Kallmann and Furst, Nucleonics, March 1951, pp. 32–39.

Scintillation Counting with Solutions, Kallmann, Physical Review, vol. 78, 1950, pp. 621–2.

Crystal Counters, Hofstadter, Nucleonics, April 1949, pp. 2–27.